(Model.)
J. STEVENS.
AUTOMATIC GRAIN WEIGHING MACHINE.
No. 278,194. Patented May 22, 1883.
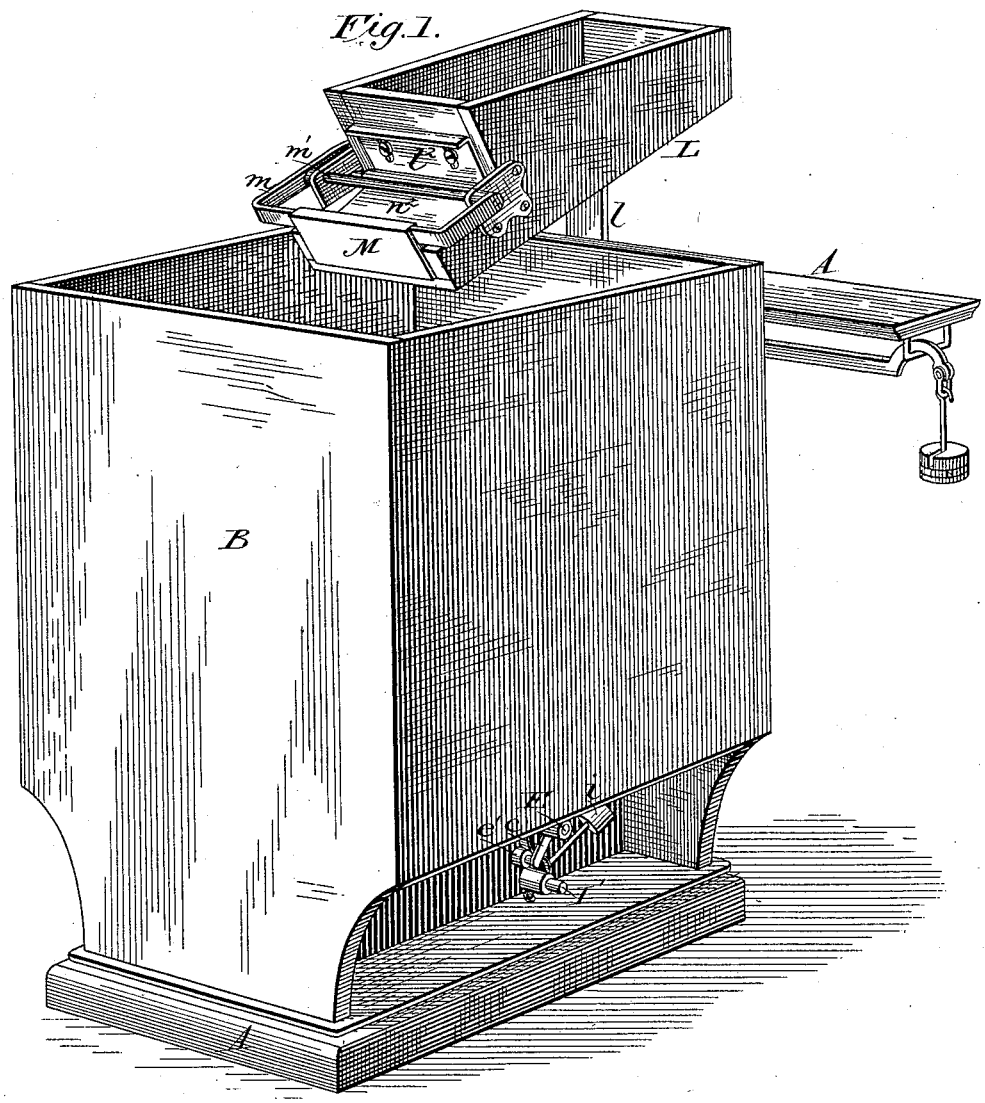
WITNESSES
INVENTOR
John Stevens.
By his Attorneys

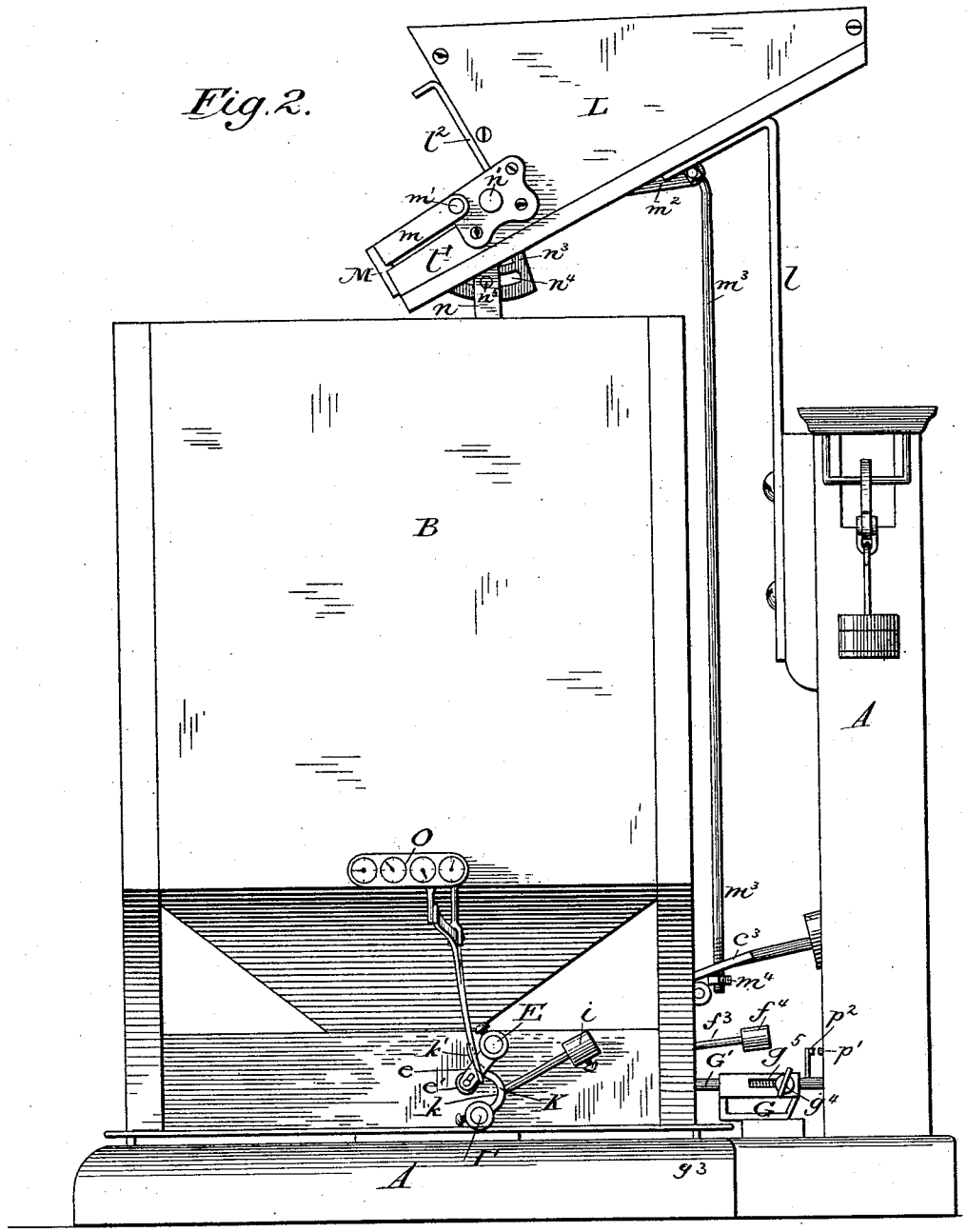

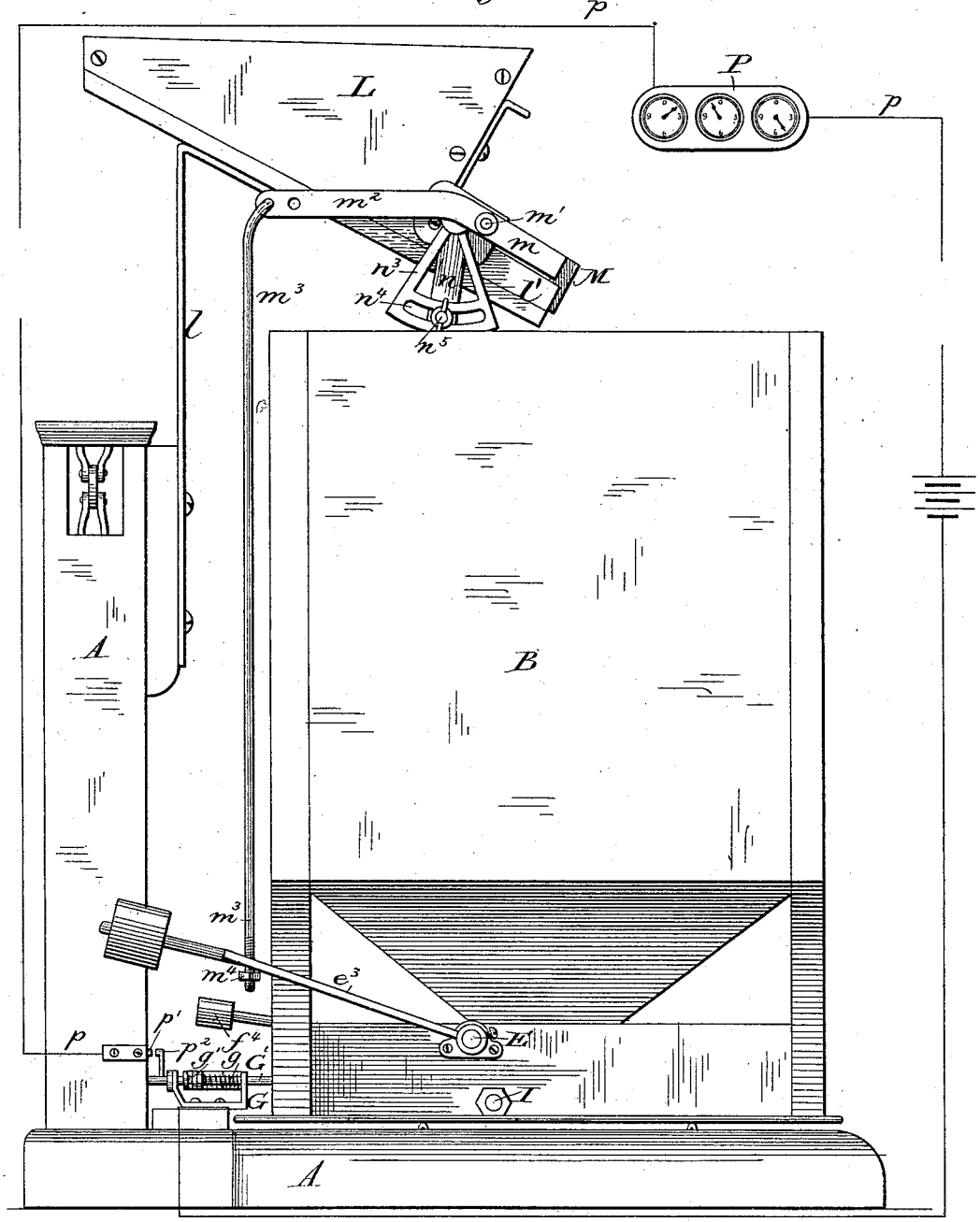

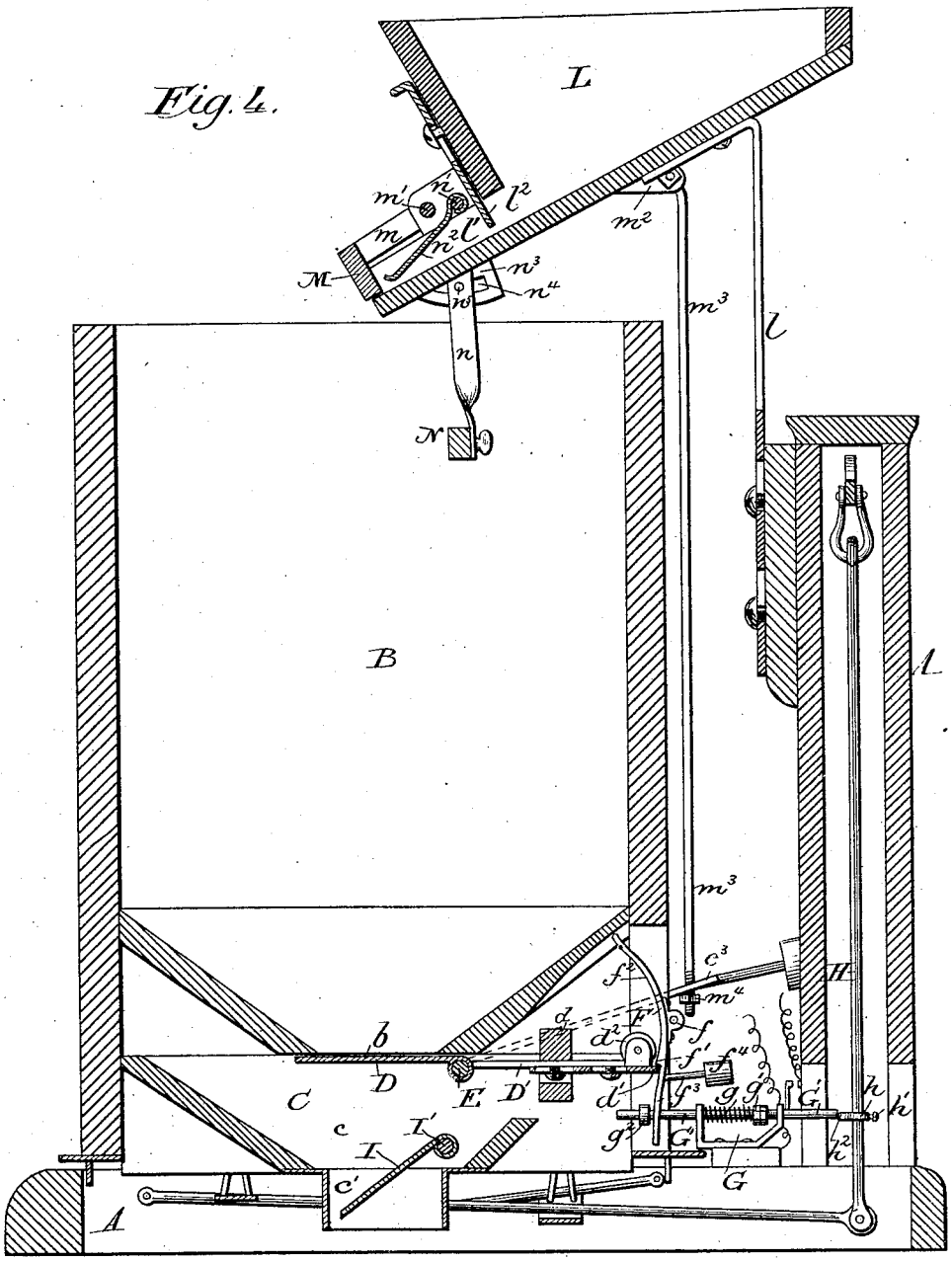

(Model.) 8 Sheets—Sheet 5.
J. STEVENS.
AUTOMATIC GRAIN WEIGHING MACHINE.
No. 278,194. Patented May 22, 1883.
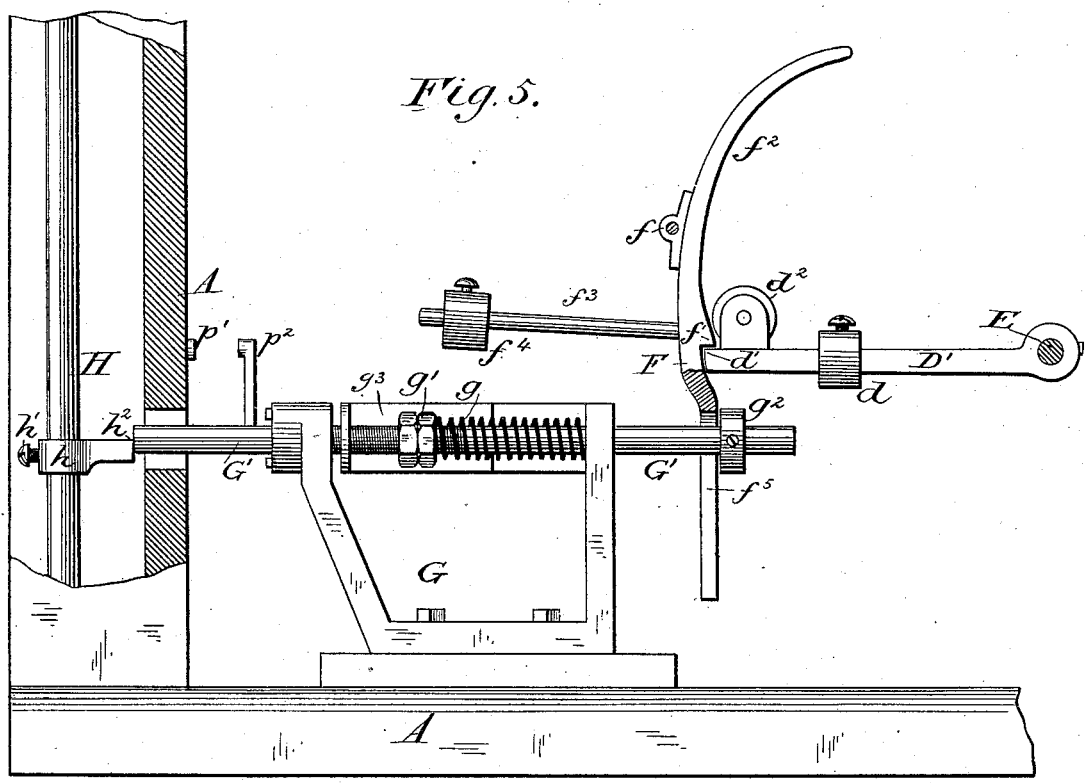
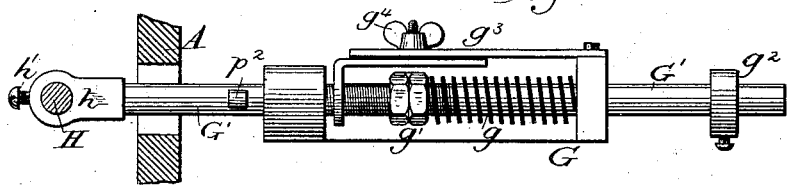

(Model.) 8 Sheets—Sheet 6.
J. STEVENS.
AUTOMATIC GRAIN WEIGHING MACHINE.
No. 278,194. Patented May 22, 1883.
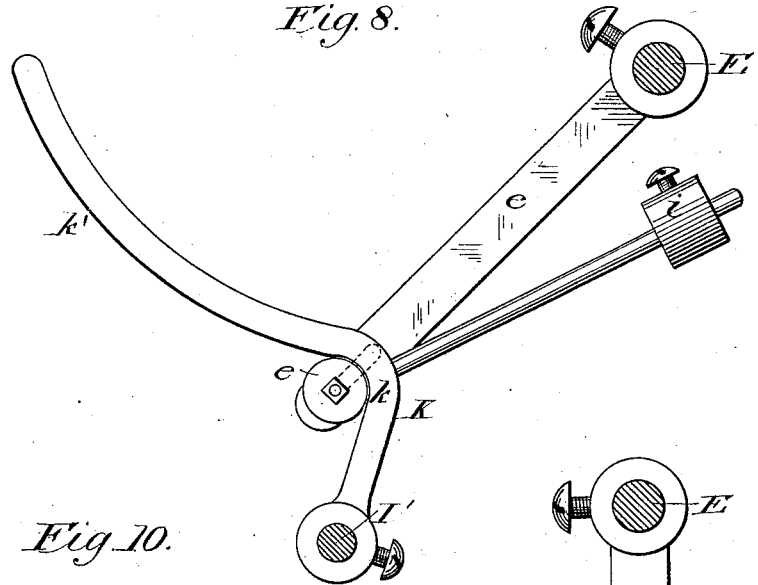
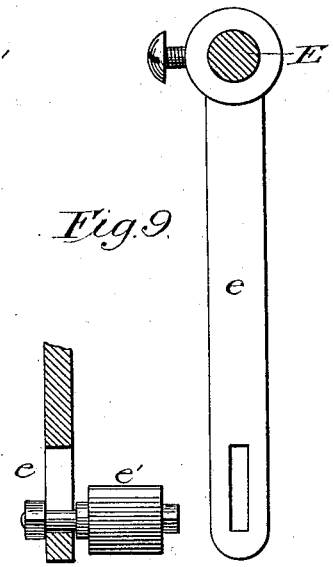
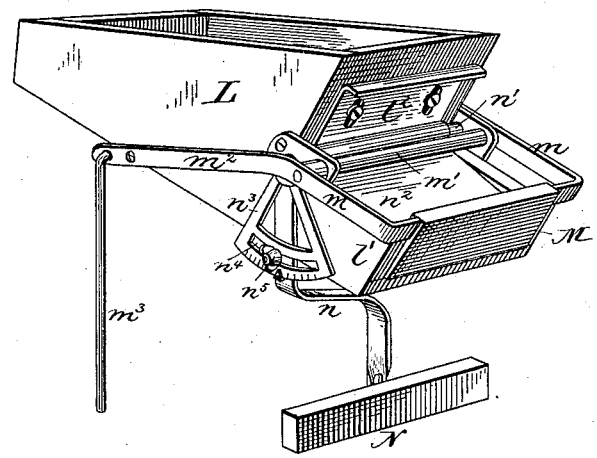
WITNESSES
INVENTOR (Model.) J. STEVENS. 8 Sheets—Sheet 7.
AUTOMATIC GRAIN WEIGHING MACHINE.
No. 278,194. Patented May 22, 1883.
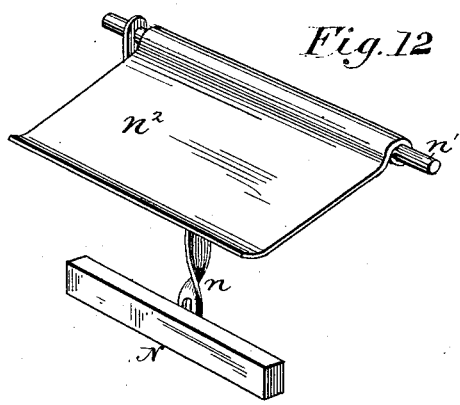
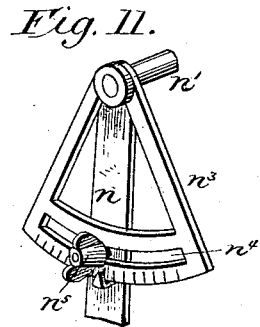
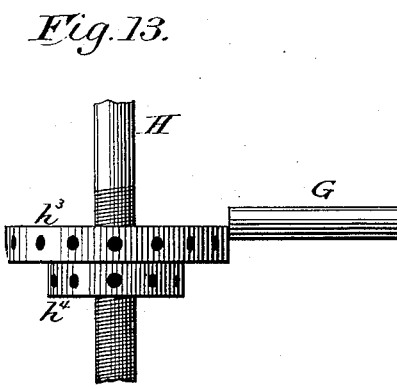
WITNESSES
INVENTOR
John Stevens
By his Attorneys (Model.)
8 Sheets—Sheet 8.
J. STEVENS.
AUTOMATIC GRAIN WEIGHING MACHINE.
No. 278,194.
Patented May 22, 1883.
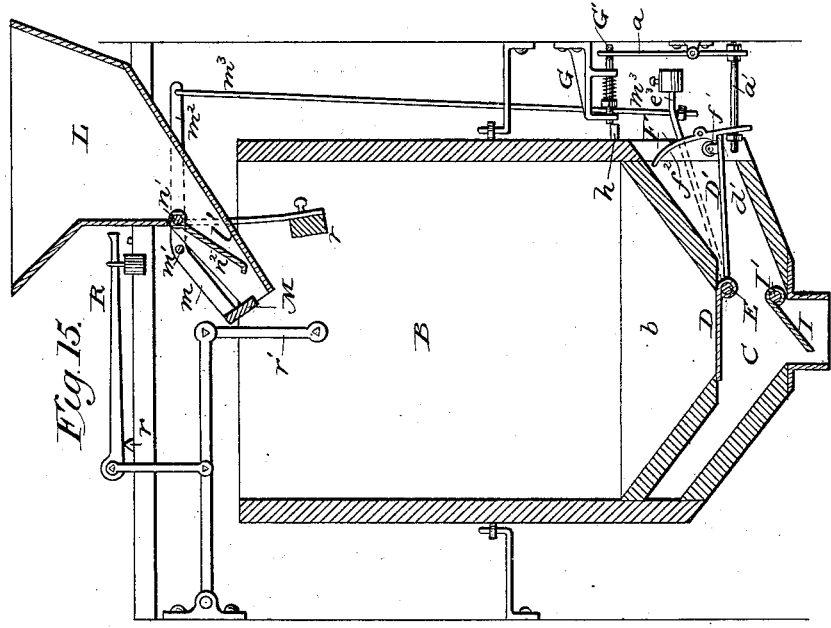
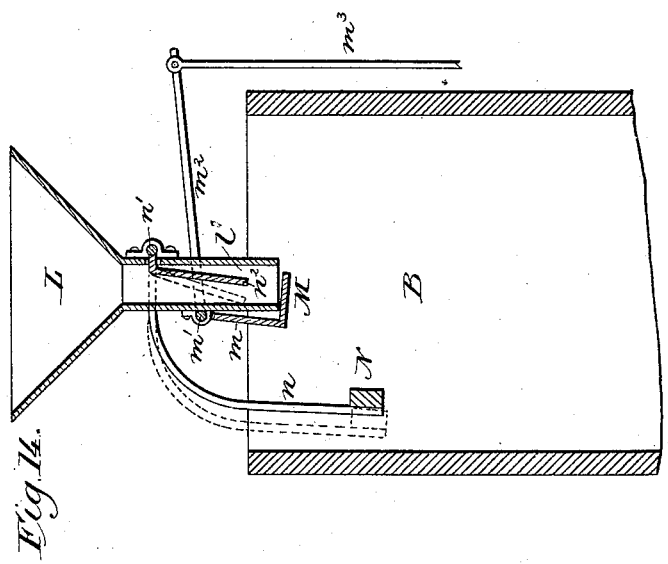
WITNESSES
Sidney P. Hollingsworth
Robt. L. Miller
INVENTOR
John Stevens
By his Attorneys
Pennison & Pennison
N. PETERS. Photo-Lithographer. Washington, D. C.

UNITED STATES PATENT OFFICE.

JOHN STEVENS, OF NEENAH, WISCONSIN.

AUTOMATIC GRAIN-WEIGHING MACHINE.

SPECIFICATION forming part of Letters Patent No. 278,194, dated May 22, 1883.

Application filed November 5, 1881. (Model.)

*To all whom it may concern:*

Be it known that I, JOHN STEVENS, of Neenah, in the county of Winnebago and State of Wisconsin, have invented certain new and useful Improvements in Automatic Weighing Apparatus, of which the following is a specification.

The object of my invention is to provide for the more efficient, accurate, and rapid weighing of corn, grain, meal, and other granular and pulverized substances capable of a comparatively regular flow; and it relates particularly to that class of weighing-machines in which the hopper or weighing-receptacle moves in vertical lines, although certain features are or may be applicable to weighing-machines of other types; and it consists in a buoyant presser-plate applied in the chute or spout through which the material is delivered to the weighing-receptacle, and operated by suitable mechanism to diminish the flow of material as the point of equilibrium is approached; in a float or governor operated by the gradual accumulation of material in the hopper or weighing-receptacle, and actuating by its movement a cut-off or presser in the delivery-chute to diminish the stream of material flowing therethrough as the point of equilibrium is approached; in the combination, with said float or governor, of adjusting mechanism whereby it may be set to vary the time or period of its action; in the combination, with the buoyant presser-plate for diminishing the flow of material through the spout, of an independent cut-off whereby such flow is completely stopped at the moment the scale is actuated; in the combination, with the discharge-gate of the weighing-receptacle, having a crank-arm on its pivot, of a supplementary gate bearing a cam-arm or catch upon its pivot, and operated by the weight of the material as it descends upon it from the first-named gate, so as to throw its catch over a pin upon said crank-arm and lock the discharge-gate open; in the combination, with a discharge-gate, of a positive locking device to hold it closed, stopped, or dogged by the scale-rod while the scale-beam is down, and tripped or released by the descent of said rod when the beam rises; in the combination, with a discharge-gate, of positive locking mechanism which is tripped at the moment the scale-beam is actuated, and is reset in position to again lock said gate by the action of the gate as it is urged open by the pressure of the accumulated material upon it; and in the various other combinations and details of construction hereinafter described.

In the drawings, Figure 1 is a perspective view of a machine embodying my invention; Fig. 2, an elevation from one side thereof; Fig. 3, a like elevation from the opposite side; Fig. 4, a vertical section through delivery-hopper, weighing-receptacle, and scale-standard; Fig. 5, a detached view of the trip-latch and trip-bolt which lock the discharge-gate into and release it from its closed position, with a portion of the scale-standard in section; Fig. 6, a top plan view of the trip-bolt; Fig. 7, an enlarged view of the trip-arm on the discharge-gate which engages with the trip-latch; Fig. 8, the crank-arm on the discharge-gate and the catch upon the secondary gate, enlarged, and in position for locking the discharge-gate open; Fig. 9, details of the crank-arm on the discharge-gate; Fig. 10, a perspective view of the hopper enlarged; Fig. 11, a detail of the device for in and out adjustment of the float; Fig. 12, the presser-plate and float detached; Fig. 13, a modification of the tripping-stop on the scale-rod; Fig. 14, a modification of the delivery-spout, presser, and cut-off; and Fig. 15, a modification of the weighing apparatus.

I prefer, and the nature of my invention admits and enables the use of, an ordinary platform-scale, A, and upon this I mount or build the weighing-receptacle B, making an opening in the platform proper in any suitable manner, as by removing the central plate, usual in such scales, through which the eduction-spout C is carried between the scale-levers to a conveyer or chute in the floor beneath. The bottom of the weighing-receptacle shelves toward an opening or aperture, *b*, immediately above the eduction or discharge spout, which opening is normally closed by a gate or valve, D, moving in the upper enlarged chamber, *c*, of said spout, and having for its axis a rock-shaft, E, to which it is fast. Beyond the rock-shaft projects an arm or shank, D', which serves primarily to counterbalance the gate and restore it to place after it has been opened, and which may, to insure the perfect performance of this function, be provided with an adjustable weight, $d$. At its end the arm has a shoulder, $d'$, and immediately above this shoulder carries an anti-friction wheel, $d^2$.

A trip-latch, F, is pivoted, by means of ears $f$ in a slot in the casing, immediately opposite the scale-standard, and on its inner curved face is cut away at a point some distance below the pivot to form a shoulder, $f'$, which catches over the shoulder $d'$ on the end of the gate-arm, thus locking the latter down and holding the gate positively closed, the anti-friction roller $d^2$ being so arranged that it comes in contact with the curved inner face or trackway, $f^2$, of said latch immediately above the engaging shoulders. An arm or rod, $f^3$, projecting rearwardly from the latch, below its pivot, and provided with an adjustable weight, $f^4$, serves to urge it normally into position to engage with and lock the gate-arm.

To the scale-base, between the casing of the weighing-receptacle and the scale-standard, is secured a bracket, G, in which are formed bearings for a sliding rod or trip-bolt, G'. A coiled spring, $g$, seated at one end against an arm on the bracket, and at the other against an adjustable nut, $g'$, on the bolt, presses the latter constantly inward through a slot in the scale-standard toward the scale-rod. At its other end the bolt passes through a slot or yoke, $f^5$, in the lower part of the latch F, and beyond this is headed or provided with an adjustable collar, $g^2$, whereby it may be made to fit properly.

Upon the scale-rod H, I place a block, $h$, and adjust it, by means of a set-screw, $h'$, into such position that when the scale-beam is down, and the scale-rod consequently raised to its full limit, the adjacent end of the spring-pressed sliding bolt will abut against and be stopped by the upper edge, $h^2$, of said block; or, instead of using this block, I may screw-thread the scale-rod and set upon it a cylindrical nut, $h^3$, having radial perforations to receive an adjusting-spike, following this nut up with a similarly-constructed jam-nut, $h^4$. The block is, however, preferable, as it involves no alteration in the scale.

A gage, $g^3$, may be mounted upon the bracket which supports the sliding or trip bolt, with its bent end in advance of the nut or nuts $g'$, and by means of its set-screw $g^4$ and slot $g^5$ so adjusted that it will limit the movement of the bolt toward the scale-rod. When the outer end of the sliding bolt is resting against the block on the scale-rod the head or collar on its inner end is just touching the inner face of the latch, and the discharge-gate is locked shut by the latter. Now, supposing a charge of grain to have been received sufficient to actuate the scale, the scale-rod will sink, carrying the block down past the end of the bolt, which will thereupon be urged forward by its spring, and will trip the latch by tipping it upon its pivot, drawing its shouldered end away from the gate-arm, thus releasing the latter. As the gate sinks beneath the heavy mass of grain the anti-friction roll on the end of its shank will ride up the curved face of the latch past the pivot and force the latter back against the stress of the spring on the trip-bolt, which will thus be restored to its first position, where it will be stopped by the immediate rise of the scale-rod, sufficient grain having by this time passed off to relieve the latter. The weighing-receptacle having been emptied of its charge, the counterbalancing-arm or shank will carry the gate back to place to close the spout, pushing the latch slightly aside as it descends until the latching-shoulders have passed each other, when the two will at once engage and the gate be again locked for the reception of a fresh charge.

It is difficult and practically impossible to so counterbalance the discharge-gate that it will allow all the contents of the receptacle to escape before it closes. It is undesirable that it should carry any back, as this destroys the accuracy of weighing, and if the counterbalance is made so weak that it allows all to escape prior to commencing its return it will frequently happen that the stream of the ensuing charge will reach the gate before it is entirely closed and force it open again. To remedy this I lock it open until the grain, or whatever material is being weighed, has completely passed off of it, and then release it and return it sharply to place by a sufficient counterbalance. This locking action is accomplished by means of a valve or secondary gate, I, fast to a rock-shaft, I', journaled in the frame-work, and projecting obliquely downward into and nearly across the lower chamber, $c'$, of the spout, so as to intercept the discharge-stream from the main gate above, but at all times leave a sufficient aperture for its entire escape. In this position it is normally held by means of a counterbalance, $i$, which may be adjustable.

Upon one end of the rock-shaft I' is a curved or cam-shaped arm or catch, K, having a re-entrant curve or pocket, $k$, and upon the corresponding end of the rock-shaft E, which supports the main gate, is a crank-arm, $e$, to the extremity of which is attached a pin or anti-friction roll $e'$. Means are provided for the adjustment of this pin or roll longitudinally of the arm in order to properly set it in assembling the parts of the machine, and to compensate thereafter for wear or springing of said parts.

The relation of the crank-arm and catch and of their respective shafts is such that when the main gate is closed the crank-arm is nearly horizontal and the curved extension $k'$ of the catch comes just behind its pin or anti-friction roll. When the main gate is tripped and forced open by the superincumbent charge the crank-arm is swung down, carrying the roll along the part $k'$ until it reaches the pocket $k$, when the valve or secondary gate is depressed by the force of the stream and swings the catch forward, confining the roll in said pocket, and thereby locking the main gate.

Premature action of the valve is obviously prevented by the contact between its curved extension and the anti-friction roll, and this extension is preferably described on an arc concentric with the shaft E, so that the roll, as it travels over its trackway thereon, may hold the valve against the stream until it reaches the pocket, when the engagement will be sharp and instantaneous.

The counter-balance on the valve is so adjusted that the engagement between the catch and the roll on the crank-arm will continue until the charge has entirely passed off the main gate and its residue is escaping from the valve. The latter will then rise and release the main gate, which will immediately shut and be locked for a fresh charge by the trip-latch. As the valve is never entirely closed, and as it is normally inclined, whatever remnant of the charge it has carried up with it in the disengaging movement will continue to flow off, and finally escape into the chute or receptacle beneath.

The discharge-spout has thus far been described as composed of two compartments, the upper one of which is the larger. This has been for convenience of identification, since the only purpose in reducing the size of the lower is to enable it to pass between the scale-levers. In some scales the levers are so arranged that the spout can be made of practically the same size in both compartments, thus enabling the valve to present a larger surface to the discharge-stream, which will be no detriment, but, on the contrary, to some extent beneficial.

Above the weighing-receptacle is placed a hopper, L, to which the material to be weighed is delivered by a suitable elevator, conveyer, or chute. In the present instance the hopper is supported upon a bracket, $l$, rising from the scale-standard. This, however, is for convenience, and is not an essential. The spout $l'$ of this hopper is inclined to extend over the mouth of the weighing-receptacle, and the throat between it and the hopper is made adjustable by means of a sliding gate, $l^2$, which may be fixed at any desired point. A cut-off, M, is arranged to shut into the open end of this spout to stop the flow of material therefrom, being supported upon arms $m$, which in turn are secured to a rock-shaft, $m'$, journaled in bearings above said spout and near its junction with the hopper.

From the end of the rock-shaft $m'$ an arm, $m^2$, extends rearwardly past the side of the hopper, and is provided with a series of perforations to receive adjustably the upper end of a link, $m^3$, which at its lower end passes through an opening in the arm $e^3$, fast to and projecting rearwardly from the rock-shaft E, the same shaft which supports the main gate, and at its opposite end through the crank-arm $e$, whereby said gate is held open. Beyond the arm $e^3$ the link receives an adjustable collar or nut, $m^4$, whereby it is prevented from escape through the opening in the arm, but is allowed to play downward therein. Said nut or collar is set up against the under side of the arm at such a point along the link that when the main gate is shut and locked by the trip-latch the cut-off will be held open. When, however, the gate is tripped and thrown open the arm $m^2$ will swing up, and the cut-off, loaded, if necessary, to overbalance the weight of the link, will instantly descend and close the spout. Therefore whenever the gate is shut a stream of grain or other material to be weighed will be constantly entering the receptacle, and whenever it is open to discharge the weighed contents the supply from above will be stopped. If the stream is flowing from the hopper with a full head at the moment the scale is actuated and the gate opens, there will be either such a portion unweighed in the air or so much will escape before the gate can completely open and the cut-off completely shut as to amount in the course of a short time to a very serious error. To prevent this it has heretofore been proposed to use a secondary cut-off operated independently and in advance of the main cut-off to gradually diminish the stream of grain as the point of equilibrium is approached, said secondary cut-off being controlled and brought into action by an initial sinking of the grain-receptacle. I propose to operate this secondary cut-off by the action of the grain as it rises in the receptacle, and for that purpose employ a float, N, depended within the receptacle, near one side thereof, by means of an arm or arms, $n$, from a rock-shaft, $n'$, journaled upon the hopper alongside the shaft of the main cut-off. The float, in the present instance, is in the form of a bar or slat, and is adjustable up and down upon its supporting arm or arms by means of slot and set-screw, as shown, or other suitable appliance, so as to properly time its action and to compensate for changes in the nature of the material or of the quantity to be weighed. The secondary cut-off $n^2$ is attached to the rock-shaft $n'$ at such an angle to the float-arms as to be carried into the spout whenever these are pushed back from their normal pendent position. As the stream falls into the receptacle it heaps up at the point where it strikes, and from the crest of this heap its particles divide and run down the talus in every direction toward the sides of the receptacle. When the surface of the talus reaches the bottom edge of the float the succeeding descending particles will be arrested and will accumulate against the side of the float and push it back with a constantly-increasing force, thus rocking the shaft and forcing the secondary cut-off gradually into the stream passing through the hopper-spout, so as to steadily diminish the flow until at the moment the scale is actuated the material falls in hardly appreciable driblets.

The sensitiveness of the float can be varied by adjusting it in or out, toward or from the incoming stream. This can be accomplished by pivoting its supporting-arm loosely to the rock-shaft $n'$, and fixing to the latter a pendent ear or plate, $n^3$, having a segmental slot, $n^4$, through which a set-screw, $n^5$, takes into the arm to clamp it at any desired point along said slot.

The secondary cut-off controlled by the float may be the usual one, formed with a knife-edge, like the main cut-off; but as this presents an angular obstruction to the stream and tends to unnaturally impede its flow and to cause clogging in part, I deem it advisable to construct it in the form of a plate, as shown, the outlines of which will trend in the direction of the stream, thus securing greater equality in its operation. In the particular instance the plate forms the top of the spout, and extends from a pivot at or proximate to the throat of the hopper to the main cut-off, being bent up near its end, so that nowhere will an abrupt edge be presented to the material passing beneath. It normally rests at this free or bent end upon the surface of the stream passing through the spout, and is sustained or buoyed up thereby, hinging upon its pivot and rising and sinking freely and sensitively with any increase or diminution in said stream, so as to allow the fluctuating volume to pass beneath unchecked, but always be in contact with it. In this sense it is herein termed "buoyant." It is thus always in position for effective action, and when forced down by the float will instantly press into the flowing mass and form, in effect, a sub-hopper with converging sides—to wit., the bottom of the spout and the under surface of the presser-plate—and gradually-diminishing exit orifice, and the effect will be as if the gate of the hopper itself were adjusted in like manner. This presser-plate is beneficial, whether controlled by the float or by other means, and I do not limit myself to its application with the latter.

A register, O, will be attached exteriorly to the casing of the machine and operated by any suitable and convenient reciprocating or vibrating part—as, for instance, by the crank-arm on the pivot of the main gate, which vibrates once to and fro for each discharge. This will indicate the number of charges passed through the machine, and the number of pounds at which the scale is set being known—for example, twenty-five hundred—the calculation of the total amount will be easy. Another register, P, I propose to place in the mill-office, over the book-keeper's desk, and operate by electricity. The wire $p$ from this may be led to the scale-standard and terminate in a button or contact-point, $p'$, against which a metallic lug, $p^2$, upon the trip-bolt is brought in the outward movement of the latter to unlatch the main gate. The ground-connection at this end is made through the trip-bolt and scale, and at the other end in any suitable manner. Should the current work on a metallic circuit—that is, through two insulated wires without ground connections—the terminals of these two wires may be arranged at a slight distance apart upon the scale-standard, and the lug upon the trip-bolt may assume the form of a bridge, so as to come in contact with both terminals as the bolt shoots forward and complete the circuit; or the connection may be made, as before, through the trip-bolt and scale to the second wire instead of the ground. In a large mill several of these weighing-machines may be used working upon different materials or products. The electric registers in the office will enable the book-keeper at the close of the day to enter up the number of pounds of wheat, of middlings, of bran, of offal, &c., that have been run through since morning without a laborious round of inspection. A comparison with the mechanical register upon the machine will enable any inaccuracy in the operation to be detected.

My invention is susceptible of various modifications—as, for instance, instead of being mounted upon a platform-scale the weighing-receptacle may be suspended from a steelyard. Such a construction is indicated in Fig. 15, wherein R is the steelyard, $r$ the fulcrum, and $r'$ one of the links by which the receptacle is suspended. Here the stop for the trip-bolt is placed upon the vertically-reciprocating receptacle instead of upon a scale-rod, and the trip-bolt itself is reversed and acts upon the latch through the medium of a lever, $a$, and link $a'$, the construction of the other parts remaining the same as hereinbefore described. In Fig. 14, also, I have shown the presser-plate or secondary cut-off applied to a vertical hopper-spout. This needs no description. Other possible changes without departing from the spirit of my invention will readily suggest themselves to a skilled mechanic.

I claim—

1. In a machine for automatically weighing grain and other material, a buoyant presser-plate applied in the chute or spout through which the material is delivered to the weighing-receptacle, and operated by suitable mechanism to diminish the flow of material as the equilibrium point is neared.

2. In a machine for automatically weighing grain and other material, a float or governor operated by the gradual accumulation of the contents of the weighing-receptacle and actuating by its movement a cut-off or presser in the delivery-chute to diminish the stream passing therethrough as the charge nears its maximum.

3. The combination, with a float or governor suspended within the weighing-receptacle and controlling a cut-off or presser, as described, of adjusting mechanism whereby it may be moved vertically to compensate for changes in the predetermined amount to be weighed.

4. The combination, with a float or governor suspended within the weighing-receptacle and controlling a cut-off or presser for diminishing the flow of the incoming stream, of adjusting mechanism whereby it may be set in or out toward or from the point where the stream reaches the accumulating mass.

5. The combination, with a buoyant presser-plate for diminishing the flow of grain and other material in a delivery-spout, of an independent cut-off whereby said flow is completely stopped at the moment the discharge from the receptacle beneath takes place.

6. The combination, with a grain-weighing receptacle and with the spout delivering thereto, of a buoyant presser-plate for diminishing the flow of material through said spout as the equilibrium point is neared, and an independent cut-off whereby said flow is completely stopped at the moment the scale is actuated.

7. The combination, with the discharge-gate having a crank-arm on its pivot, of a supplementary gate or valve having a cam arm or catch upon its pivot, and operated by the weight of the stream as it descends from the first-named gate, so as to throw its catch over a pin or anti-friction roll upon said crank-arm and lock the discharge-gate open.

8. The combination, in an automatic weighing-machine, of a platform-scale, a weighing-receptacle seated upon the platform thereof, and tripping instrumentalities for the discharge-gate of said receptacle, stopped or dogged by the scale-rod when in its position of rest and released by the descent of said rod as equilibrium is passed.

9. The combination, with a discharge-gate, of a positive locking device to hold it closed, stopped, or dogged by the scale-rod while the scale-beam is down, and tripped or released by the descent of said rod when the beam rises.

10. The combination, with a discharge-gate, of a positive locking mechanism which is tripped by the descent of the scale-rod at the moment the scale is actuated, and reset in position to again lock said gate by the action of the gate itself as it is urged open by the pressure of the charge.

11. The combination, with the discharge-gate, of locking and releasing mechanism, and an adjustable stop on the scale-rod, adapted to block or dog said mechanism to retain the gate closed until the descent of the rod as the scale is actuated.

12. The combination, with the weighing apparatus, of the electric register in the mill-office, the button or contact-point upon the scale-standard, the connecting-wire, and a lug upon the trip-bolt whereby the circuit is completed to actuate the register by the movement of said bolt.

13. The combination, substantially as described, of the discharge-gate, the pivoted trip-latch, with its curved track, and the trip-bolt.

14. The combination, substantially as described, of the discharge-gate, the trip-latch, the trip-bolt, and the stop on the scale-rod.

15. The combination, substantially as described, of the discharge-gate, the trip-latch, the trip-bolt and its lug, the electrical button upon the scale-standard, and the electrical register in the mill-office.

16. The combination, with the trip-bolt, of the adjustable gage, as and for the purpose set forth.

17. The combination, substantially as described, of the weighing-receptacle mounted upon a platform-scale, the discharge-gate, the trip-latch, the trip-bolt, the stop on the scale-rod, and a suitable delivery-spout.

18. The combination, substantially as described, of the weighing-receptacle mounted upon a platform-scale, the discharge-gate, the trip-latch, the trip-bolt, the stop on the scale-rod, a hopper supported upon the scale-standard, and the cut-off in said hopper-spout connected with the discharge-gate.

19. The combination, substantially as described, of the discharge-gate, its rock-shaft, the trip-latch, the arm $e^3$, the cut-off in the delivery-spout, and the link $m^3$, connecting said cut-off and arm.

20. The combination, substantially as described, of the discharge-gate, its rock-shaft, the crank-arm and pin on said rock-shaft, the secondary gate carrying a catch, the arm $e^3$, also on said rock-shaft, the cut-off in the delivery-spout, and the link connecting said arm $e^3$ to an arm on the cut-off pivot.

21. The combination, substantially as described, of the discharge-gate, its rock-shaft, the trip-latch, the crank-arm and pin on said rock-shaft, the secondary-gate and its catch, the arm $e^3$, also on said rock-shaft, the cut-off in the delivery-spout, and the link connecting said arm $e^3$ with an arm on the cut-off pivot.

22. The combination, with the delivery-spout, of the buoyant presser-plate turned up at its end, as and for the purpose set forth.

23. The combination, with the cut-off at the end of the delivery-spout, of the buoyant presser-plate forming the cover to said spout.

24. The combination, substantially as described, of the float, its supporting link or links, hung loosely to the rock-shaft which supports the secondary cut-off, the segmentally-slotted ear fast to said shaft, and the set-screw passing through the slot and taking into the link.

25. The pivoted trip-latch having a yoke to receive the head of the trip-bolt, a shoulder to lock the gate-arm, and a curved trackway for the anti-friction roll on the end of said arm.

26. The catch on the end of the supplementary gate-pivot, having a re-entrant curve or pocket and a curved extension, as and for the purpose set forth.

27. The adjustable stop upon the scale-rod, as and for the purpose set forth.

JOHN STEVENS.

Witnesses:
JOHN SHIELLS,
ALEX MCNAUGHTON.